July 30, 1940.    R. H. McCARROLL ET AL    2,209,786
CUPOLA TYPE FURNACE CONSTRUCTION
Filed Nov. 25, 1938    2 Sheets-Sheet 1

WITNESS
E. Nitzke

INVENTORS.
R. H. McCarroll
C. A. Reams
BY W. R. Powers
E. C. McRae & C. L. Davis.
ATTORNEYS

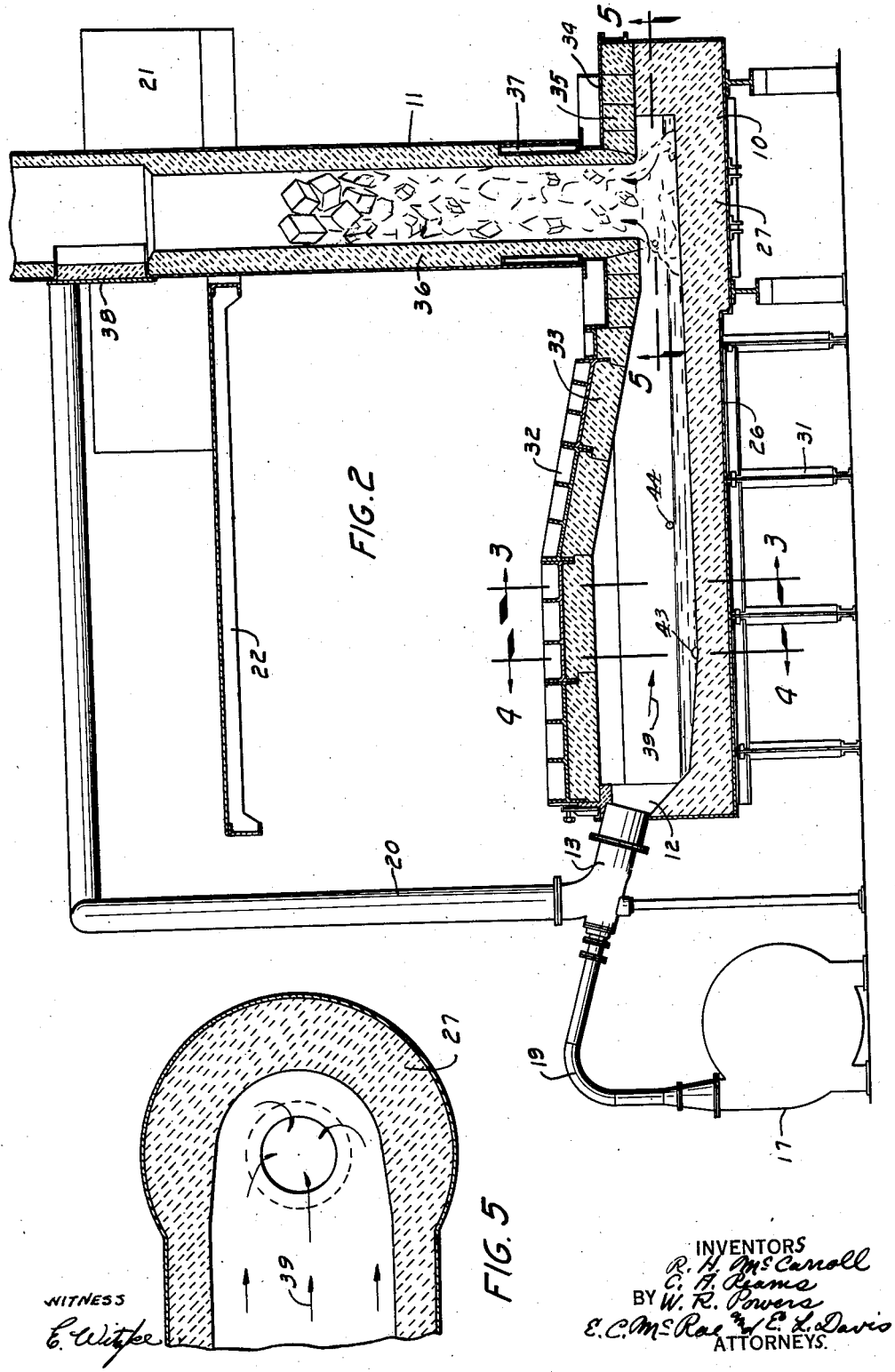

Patented July 30, 1940

2,209,786

UNITED STATES PATENT OFFICE 2,209,786

CUPOLA TYPE FURNACE CONSTRUCTION

Russell H. McCarroll and Clinton A. Reams, Dearborn, and William R. Powers, Detroit, Mich., assignors to Ford Motor Company, Dearborn, Mich., a corporation of Delaware Application November 25, 1938, Serial No. 242,244

6 Claims. (Cl. 263—27)

The object of our invention is to provide means for melting ferrous material without altering its carbon content. Our improved furnace therefore finds its greatest utility in the production of steel castings from scrap metal, the production of malleable iron, and in the production of cast iron. The conventional cupola can only be used for the production of cast iron because the absorption of carbon by the iron from the coke charge is unavoidable. For this reason it has in the past been necessary to use other types of furnaces to produce steel or other low carbon metal, such as malleable iron and the like.

Electric furnaces, open-hearth furnaces and rotary malleable iron furnaces have come into extensive use in the production of low carbon steel and malleable iron, but all of these furnaces have the common disadvantage of being intermittent in operation. Formerly, this characteristic was not so objectionable but at the present time advanced foundry practice calls for continuous pouring, the molds being conveyed past the melting furnace where they are successively poured. Consequently, it is highly desirable that the molten metal be available in a continuous stream, as the stoppage of the conveyor line while the furnace is being recharged entails high labor loss as well as overwork while the conveyor is in operation. To provide such a continuous stream of molten steel, holding furnaces in combination with intermittently operated electric furnaces have been used but the high heat loss unavoidable with this equipment materially increases the cost of the metal.

The primary object of this invention is therefore to provide a furnace which is continuous in operation, producing a continuous stream of molten metal which in its passage through the furnace is melted without changing its carbon content.

Still a further object of our invention is to provide an improvement in the furnace construction per se, whereby the furnace is better able to resist the relatively high temperatures necessitated in the melting of steel.

Still a further object of our invention is to provide a furnace of higher thermal efficiency, the increased efficiency resulting from the absorption of waste heat by the incoming charge after the gases have dropped to a temperature below that at which they are useful in melting the material in the furnace.

Still a further object of our invention is to provide a furnace in which the charge is introduced through a vertical stack, the charge being supported by the hearth of the furnace beneath the liquid level of the metal therein. Longer furnace life results because the charge when melting does not contact any of the refractory. The point of highest temperature is in that portion of the charge just above the level of the liquid metal in the furnace so that the metal flows down the charge itself into the bath. If the metal needed to flow down a refractory surface, as in some other furnaces the washing away of the refractory would be unavoidable at the high temperature required for this work.

With these and other objects in view, our invention consists in the furnace arrangement and construction, as described in this specification, claimed in our claims, and illustrated in the accompanying drawings, in which:

Figure 2 is a sectional view, taken upon the line 2—2 of Figure 1.

Figure 5 is a sectional view, taken upon the line 5—5 of Figure 2.

Figure 1:
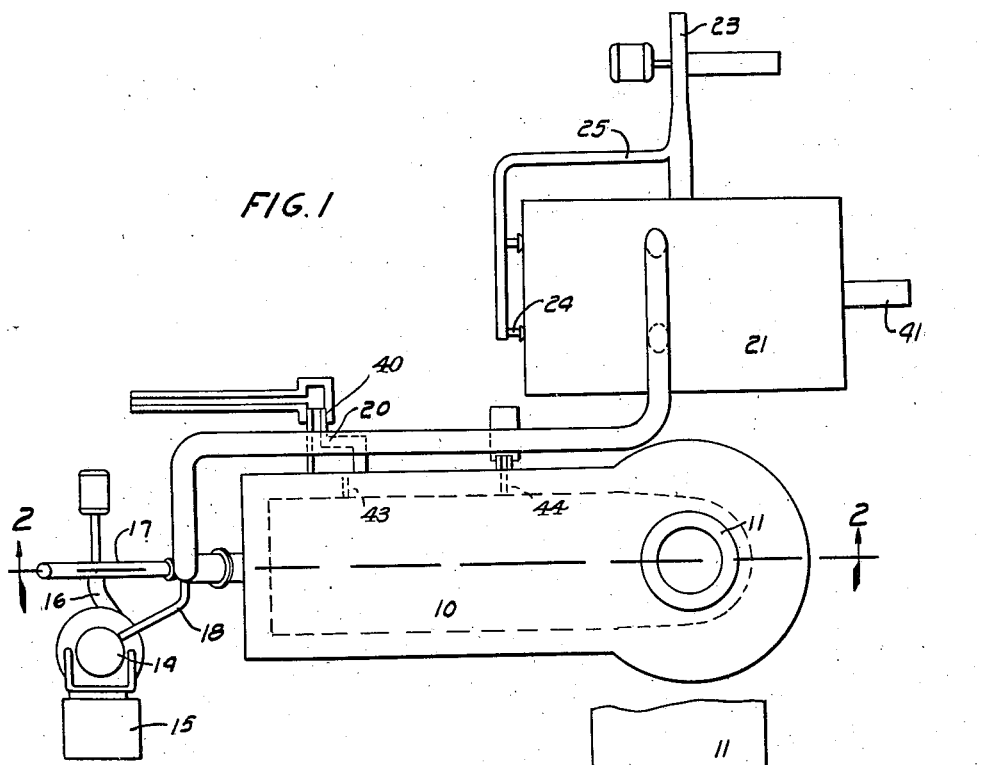
Figure 1 is a plan view of our furnace and the auxiliary equipment required to pulverize the fuel, preheat and blow the air for combustion into the furnace.
Figure 4:
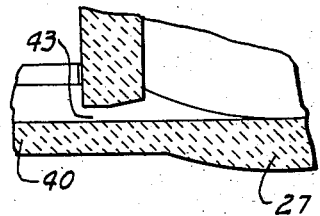
Figure 4 is a sectional view, taken upon the line 4—4 of Figure 2.
Figure 3:
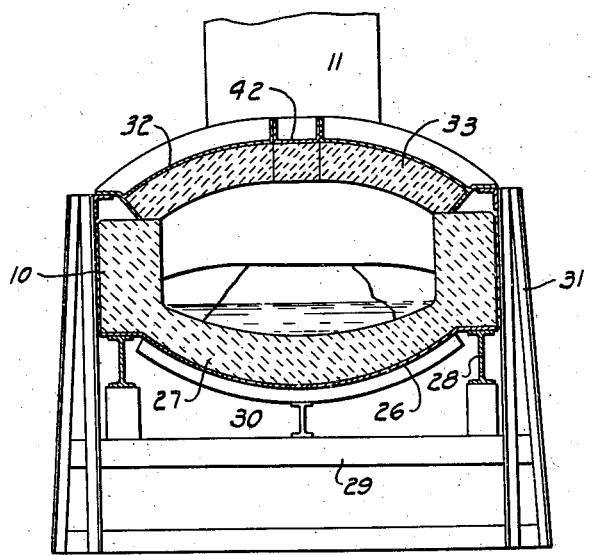
Figure 3 is a sectional view, taken upon the line 3—3 of Figure 2.

Referring to the accompanying drawings, we have used the reference numeral 10 to indicate the furnace proper of our construction, which furnace is provided with a stack 11 which extends upwardly from one end thereof. A burner opening 12 is provided in the other end of the furnace in which a burner 13 is located. The burner is adapted to burn powdered coal, the coal being treated by a coal pulverizer 14 in which granulated coal is fed from a hopper 15. The coal is ground in the pulverizer 14 to the consistency of coarse lamp black and is conducted by a conduit 16 to a centrifugal blower 17. A stream of air from a pipe 18 is fed into the pulverizer to carry the pulverized fuel to the blower 17. A conduit 19 leads from the blower to the burner 13. The main portion of the air for combustion is supplied by a pipe 20 which runs from a gas fired pre-heater 21, which in this particular installation is located upon a balcony or charging floor 22 for the furnace. A centrifugal blower 23 supplies air to the pre-heater 21, a small portion of the output of the blower 23 being conducted to burners 24 of the pre-heater through a pipe 25. A flue 41 in the pre-heater conducts the products of combustion therefrom. The auxiliary apparatus which have been enumerated have not been described in detail as they form no part of our invention and as only conventional equipment required to burn powdered coal is employed.

The operation of the furnace as so far described is as follows:

Air is forced by the blower 23 into the pre-heater 21 where it is heated to approximately 600° F. and is then conducted to the burner 13 where it mixes with the stream of air and powdered coal which is blown into the furnace by the blower 17. The mixture of air and fuel ignites at the burner. The flame is directed lengthwise and reaches its maximum temperature at the opposite end of the furnace where the products of combustion are discharged through the stack 11.

Our furnace proper comprises a box-shaped housing 26 which is lined on the sides, ends and bottom with refractory material 27. A pair of I-beam section side rails 28 extend lengthwise beneath each side of the furnace, these rails being supported upon a frame 29. A center rail 30 also extends lengthwise beneath the bottom of the furnace which is also supported upon the frame 29. The bottom or hearth of the furnace slopes gradually upwardly from the burner end but all portions of the hearth are beneath the normal liquid level maintained in the furnace.

Vertical uprights 31 are spaced along each side of the furnace and support a roof over the furnace. It will be noted that the uprights 31 do not touch the outer walls of the furnace so that the furnace is permitted to expand or contract both lengthwise and laterally. The uprights only support the roof. The roof in this particular installation is constructed of four arch shaped bungs 32 which extend across the furnace. The bungs are lined with refractory 33 and are each provided with a central door 42 which may be removed so that minor repairs can be made without dismantling the furnace. The two bungs adjacent to the burner end of the furnace are arched to form a level roof while the two remaining bungs are so shaped that the roof tapers downwardly to position adjacent to the stack.

That portion of the roof which supports the stack is formed as a flat plate 34 having a refractory lining 35 therein. The stack 11 extends upwardly from the center portion of the plate 34 and is lined with refractory material 36. The outside surface of the plate 34 is water cooled and a cylindrical water cooling tube 37 is embedded in the base of the stack to protect the lining, as is customary in the high temperature zones of such furnaces. A tap hole 43 is provided in one side of the furnace and a runway 40 conducts the metal from the tap hole to the molds to be poured.

The furnace just described, has a clear inside width of about 6½ feet and a height at the burner end of about 3½ feet. The roof tapers downwardly from the burner end so that the height of the furnace at the stack is about 18 inches. The stack extends upwardly about 35 feet through the roof of the building in which the furnace is located and has an inside diameter of 30 inches. At a distance of about 16 feet from the top of the furnace a charging door 38 is provided which door is accessible from the charging floor 22 so that the charge may be fed into the stack through the door 38.

It will be noted from Figures 2 and 5 that the stack intersects the plate 34 a short distance from the end of the furnace, and that the stack has a considerably smaller cross-sectional area than that of the furnace proper. Consequently, the gaseous fuel before entering the stack follows the path shown by arrows 39 in Figure 5. Some of the gases are directed to the far end of the furnace where they return upon themselves and enter the stack at the side opposite the burner.

To start the furnace in operation, the burner 13 is ignited and the furnace is brought up to a temperature between 2850° F. and 2950° F. The charge is then added at about five minute intervals through the charging door, the material resting on the bottom of the furnace and extending upwards in the stack to within about 25% of the distance from the hearth to the charging door. This level of charge is maintained to insure maximum operating efficiency.

An important feature of this furnace construction is that the flame in entering the stack must penetrate through the charge where a major portion of its heat content is absorbed. The gases in going up through the stack pass through the interstices in the charge so that a large portion of the remaining heat of the flame is absorbed.

When a total of about 10 tons of the charging material has been placed in the cupola, the tap hole in the hearth is opened and the metal checked for analysis. If the analysis is found correct, the metal is allowed to flow through the runway 40 to the molds to be filled. Meanwhile, the charging operation continues keeping the level of the charge at a constant height.

Shortly after the first tap out of metal, the slag is drawn at regular intervals from the hearth through a slag opening 44 provided for that purpose. This is important for if the slag blanket over the metal is allowed to become too deep, it will make the metal in the hearth impervious to heating by the pulverized coal flame. Also, the slag readily attacks the walls of the furnace cutting them away and weakening the whole furnace refractory structure.

It will be noted that the bottom of the furnace or hearth slopes downwardly from the stack end of the furnace. Thus, the molten metal bath is slightly deeper at the burner end than at the stack end. However, the normal level of metal maintained in the furnace submerges the charge at the stack so that when the metal in the stack melts, it dissolves into the bath in the hearth.

Among the many advantages arising from the use of our improved furnace, it may be well to mention that in directing the flame from the furnace so that it enters the charge around its full periphery very efficient melting is obtained without permitting the flame to play directly upon any portion of the refractory. Furthermore, the charge being fed through the stack provides very efficient operation because of the absorption of the otherwise wasted heat from the flame before it is discharged from the furnace. The tapered roof construction employed with this furnace forms a further important feature of the construction as it deflects the products of combustion downwardly against the charge without being directly in the path of the flame. In this way the metal in the hearth is maintained at about 2900° F. and still the walls of the furnace do not exceed this temperature.

The most important commercial advantage of our improved furnace is that molten metal may be supplied continuously at a fuel consumption of slightly less than 300 pounds of coal per ton of molten steel. This is considerably more efficient than the best practice heretofore obtainable, using either the electric furnace or open-hearth in combination with a holding furnace. This efficiency is due in part of course to the relatively small amount of radiating surface in proportion to the capacity of the furnace, and in part, to the absorption of waste heat by the charge.

Some changes may be made in the size and shape of various elements of our improved furnace without departing from the spirit of our invention, and it is our intention to cover by our claims such changes as may reasonably be included within the scope thereof.

We claim as our invention:

1. A furnace adapted to continuously melt ferrous material without materially changing its carbon content comprising, a rectangular shaped refractory lined chamber, a burner mounted in one end of said chamber which directs a flame lengthwise therethrough, the roof of said chamber sloping downwardly from the burner end thereof and the floor of said chamber sloping upwardly from said burner end, a stack extending upwardly through the roof of said chamber adjacent to but spaced a short distance from the end of said chamber opposite said burner, the diameter of said stack being materially less than the width of said chamber and the material to be melted forming a column within said stack, the lower end of which rests upon the floor of said chamber so that the products of combustion of said flame will pass around the portion of the material within said chamber and enter said stack around its full periphery, and means for maintaining the level of the molten metal in said chamber above the base of said column of material to be melted.

2. A furnace adapted to continuously melt ferrous material without materially changing its carbon content comprising, a rectangular shaped refractory lined chamber having a burner mounted in one end thereof which directs a flame lengthwise therethrough, the roof of said chamber comprising a plurality of bungs, each of which is supported independently over said chamber, said roof sloping downwardly from the burner end and the floor of said chamber sloping upwardly from the burner end, and a stack extending upwardly through the roof of said chamber adjacent to but spaced a short distance from the end of said chamber opposite said burner, the inside diameter of the stack being less than the width of said chamber, and the material to be melted forming a column within said stack, the lower end of which rests upon the floor of said chamber beneath the level of the molten metal therein, so that the flame from said burner in entering said stack must enter through the charge around its full periphery.

3. A furnace adapted to continuously melt ferrous material without materially changing its carbon content comprising, a rectangular shaped refractory lined chamber, a burner mounted in one end of said chamber which directs a flame lengthwise therethrough, side-rails extending lengthwise beneath said chamber for supporting said chamber, said rails being vertically supported upon a frame, uprights secured to said frame at spaced intervals therealong, said uprights supporting bungs which form a roof for said chamber and said uprights being laterally spaced from the side walls of said chamber so that the chamber may expand or contract, the roof of said chamber sloping downwardly from the burner end thereof and the floor of said chamber sloping upwardly from said burner end, a stack extending upwardly through the roof of said chamber adjacent to but spaced a short distance from the end of said chamber opposite said burner, the diameter of said stack being materially less than the width of said chamber and the material to be melted forming a column within said stack, the lower end of which rests upon the floor of said chamber so that the products of combustion of said flame will pass around the portion of the material within said chamber and enter said stack around its full periphery, and means for maintaining the level of the molten metal in said chamber above the base of said column of material to be melted.

4. A furnace adapted to continuously melt ferrous material without materially changing its carbon content comprising a chamber having burner means at one end thereof and a cupola stack adjacent to but spaced inwardly from the walls of said chamber at the opposite end thereof; and a floor in said chamber having a slight slope downwardly from the stack and toward the burner end of said chamber, said stack being adapted to receive a charge of material which forms a column resting on said floor, the slope of said floor being such that a body of molten metal always surrounds the base of said column in the normal operation of the furnace.

5. A furnace adapted to continuously melt ferrous material comprising a chamber; burner means for directing a flame through said chamber, said chamber having a floor portion sloping gently upwardly from said burner end; and a cupola stack adjacent the opposite end of said chamber, the lower end of said stack being spaced inwardly from the adjacent end and side walls of said chamber and being arranged so that the material to be melted forms a column within said stack with the lower end of the column resting upon the floor of said chamber so that the products of combustion from the burner means pass around the portion of the material within said chamber and enter said stack around substantially its full periphery, the slope of said floor being sufficient to effect draining of the furnace when desired but insufficient to completely drain the molten metal away from around the bottom of said column during the normal operation of the furnace whereby a body of molten metal is normally maintained in surrounding relation to the base of said column.

6. A furnace adapted to continuously melt ferrous material without materially changing its carbon content comprising a refractory lined chamber; burner means for directing a flame through said chamber, said chamber having a roof sloping gently downwardly from the burner end thereof and a floor sloping gently upwardly from said burner end; a cupola stack extending through said roof adjacent the opposite end of said chamber; the lower end of said stack being spaced inwardly from the adjacent end and side walls of said chamber and being arranged so that the material to be melted forms a column within said stack, the lower end of the column resting upon the floor of said chamber so that the products of combustion from the burner means pass around the portion of the column within said chamber and enter said stack around substantially its full periphery; and means for maintaining the level of the molten metal in said chamber above the base of the column of material to be melted.

RUSSELL H. McCARROLL.
CLINTON A. REAMS.
WILLIAM R. POWERS.